United States Patent [19]

Venkatesh et al.

[11] Patent Number: 5,731,876
[45] Date of Patent: Mar. 24, 1998

[54] METHOD AND APPARATUS FOR ON-LINE DETERMINATION OF THE THICKNESS OF A MULTILAYER FILM USING A PARTIALLY REFLECTING ROLLER AND LOW COHERENCE REFLECTOMETRY

[75] Inventors: Shalini Venkatesh, Santa Clara; Brian L. Heffner, Los Altos; Wayne V. Sorin, Mountain View, all of Calif.

[73] Assignee: Hewlett-Packard Company, Palo Alto, Calif.

[21] Appl. No.: 718,077

[22] Filed: Sep. 17, 1996

[51] Int. Cl.$^6$ ..................................... G01B 9/02
[52] U.S. Cl. .................. 356/357; 356/73.1; 356/345
[58] Field of Search .......................... 356/345, 355, 356/357, 73.1

[56] References Cited

U.S. PATENT DOCUMENTS 3,982,816  9/1976  Watkins ........................... 356/355
5,473,432  12/1995  Sorin .............................. 356/357

Primary Examiner—Frank G. Font
Assistant Examiner—Robert Kim

[57] ABSTRACT

An apparatus and method for measuring the thickness of a film having top and bottom surfaces. The apparatus includes low coherence light source that generates a probe light signal. The film is positioned against a roller having a partially reflecting surface that is positioned at a fixed distance from the film. The probe light signal is applied to the film and is then reflected back through the film by the partially reflecting surface. The light leaving the film is collected to form the input to a receiver that determines the time delay between light reflected from the top and bottom surfaces of the film. The receiver output may also be used to determine the thickness of the various layers in a multi-layer film.

14 Claims, 6 Drawing Sheets

5,731,876

METHOD AND APPARATUS FOR ON-LINE DETERMINATION OF THE THICKNESS OF A MULTILAYER FILM USING A PARTIALLY REFLECTING ROLLER AND LOW COHERENCE REFLECTOMETRY

FIELD OF THE INVENTION

The present invention relates to optical reflectometry, and more particularly, to an apparatus for measuring the thickness of a film, web or sheet.

BACKGROUND OF THE INVENTION

In many industrial processes, control of film thickness is of critical importance. For example, the manufacture of photographic film requires the generation of a uniform layer of emulsion on a backing. From the point of view of process control, it is advantageous to be able to measure the film thickness during the film generation process rather than measuring the film in a laboratory after the film has been manufactured. If samples are measured off-line, correction of any machinery malfunction cannot be performed until after a considerable volume of defective material has been processed. This leads to waste. For the purposes of the present discussion, the term "film" includes sheets and webs.

Prior art methods for measuring film thickness may be divided into contact and non-contact methods. In one contact method, a micrometer that comes in physical contact with both sides of the film is employed. These methods have the disadvantage of physically deforming the film during the measurement leading to inaccurate measurements and possible damage to the film from pitting or scratching. In addition, the methods are difficult to apply for the on-line measurement of fast moving film webs. Finally, this method cannot measure the relative thicknesses of the various layers in a multi-layer film.

Non-contact methods based on the attenuation of a beam of subatomic particles or radiation such as beta particles or gamma rays are also known to the prior art. For example, the attenuation of a beam of electrons by the film is used to determine the film thickness in one prior art method of this type. This methodology has four disadvantages. First, the system must be calibrated for each type of film, since the attenuation depends on the chemical composition and density of the film. Second, the system typically relies on a radioactive source to generate the particle beam. It is generally desirable to limit the use of radioactive material for cost, safety, and psychological reasons. Third, access is normally required to both sides of the film so that the source can be placed on one side and the detector on the other. Finally, this method cannot determine the individual thicknesses in a multi-layer film.

Methods for measuring the thickness of films using an optical autocorrelator are known also known to prior art. For the purposes of this discussion, an optical autocorrelator is defined to be an interferometer having a variable differential time delay. One embodiment of an optical autocorrelator is described, for example, in chapter 5 of Statistical Optics, by Joseph W. Goodman (John Wiley & Sons, 1985, pp. 157–170). Those skilled in the art are aware of the principles of operation of an optical autocorrelator, but certain principles will be clarified here because of their relevance to this patent. In an autocorrelating interferometer wherein light is split into two different paths and then recombined and directed to a photodiode, the detected light intensity is measured as a function of a parameter. This parameter can be the differential optical path length ΔL of the interferometer or it can be the differential time delay Δt of the interferometer. These parameters are related by ΔL=(c Δt)/n, where c is the speed of light in vacuum and n is the group index of the medium (usually air) of the differential optical path. The detected light intensity expressed as a function of the differential time delay is called the coherence function of the input light. Hence, a receiver which determines the time delay between light reflected from different surfaces of a film performs the same function as a receiver which determines the path difference between light reflected from different surfaces of a film. Determining the spacing between peaks in the coherence function of the reflected light is yet another way to describe the same function. For the purposes of the present discussion, the term differential time delay shall include differential path lengths.

A Michelson interferometer is an example of such an autocorrelator. An example of an apparatus for measuring film thickness which utilizes a Michelson interferometer is taught in U.S. Pat. No. 3,319,515 to Flournoy. In this system, the film is illuminated with a collimated light beam at an angle with respect to the surface of the film. The front and back surfaces of the film generate reflected light signals. The distance between the two reflecting surfaces is then determined by examining the peaks in the autocorrelation spectrum generated in a Michelson interferometer that receives the reflected light as its input. Unfortunately, this method can determine only the product of the group index and the film thickness. If a variation is detected in this quantity, additional measurements must be made to determine if the film composition has changed or the thickness has changed. The group index is defined to be the ratio of the propagation velocity of a light pulse in a vacuum relative to the velocity of propagation of the pulse in the medium.

If the film consists of a number of layers having different thicknesses or indices of refraction, the above method cannot always provide an unambiguous answer with respect to the product of the thickness and index of refraction for each layer. The output of the autocorrelating interferometer consists of a number of peaks whose locations depend on the difference in optical path length for each possible pair of reflecting boundaries. As the number of boundaries increases, the number of peaks increases rapidly. For example, a three layer film will generate an output having 13 peaks corresponding to the various "single pass" reflections in the system described above. There will be additional peaks corresponding to light that is reflected more than once in the film.

In a co-pending patent application U.S. Ser. No. 08/520,198 filed on Aug. 28, 1995, a method for simplifying the autocorrelation spectrum obtained from a multi-layer film is described. In this method, a reference surface is introduced near the film. The reflections from this reference surface provide a method for simplifying the spectrum and for determining the thicknesses of the various layers. Unfortunately, the simplification of the spectrum depends on the distance between the reference surface and the film remaining constant. This condition is difficult to satisfy on a production line in which the film moves at high speeds and tends to "flutter".

Broadly, it is the object of the present invention to provide an improved apparatus and method for measuring the thickness of a thin film.

It is a further object of the present invention to a system that does not require contact between the film and the measuring device.

It is a still further object of the present invention to provide a system that can also accommodate flutter in the film.

It is a still further object of the present invention to provide a system that can determine the thicknesses of the various layers in a multi-layer film.

These and other objects of the present invention will become apparent to those skilled in the art from the following detailed description of the invention and the accompanying drawings.

SUMMARY OF THE INVENTION

The present invention comprises an apparatus and method for measuring the thickness of a film having top and bottom surfaces. The apparatus includes low coherence light source that generates a probe light signal. The film is positioned against a roller having a partially reflecting surface that is positioned at a fixed distance from the film. The probe light signal is applied to the film and is then reflected back through the film by the partially reflecting surface. The light leaving the film is collected to form the input to a receiver that determines the time delay between light reflected from the top and bottom surfaces of the film. The receiver output may also be used to determine the thickness of the various layers in a multi-layer film.

DETAILED DESCRIPTION OF THE INVENTION

Figure 1:
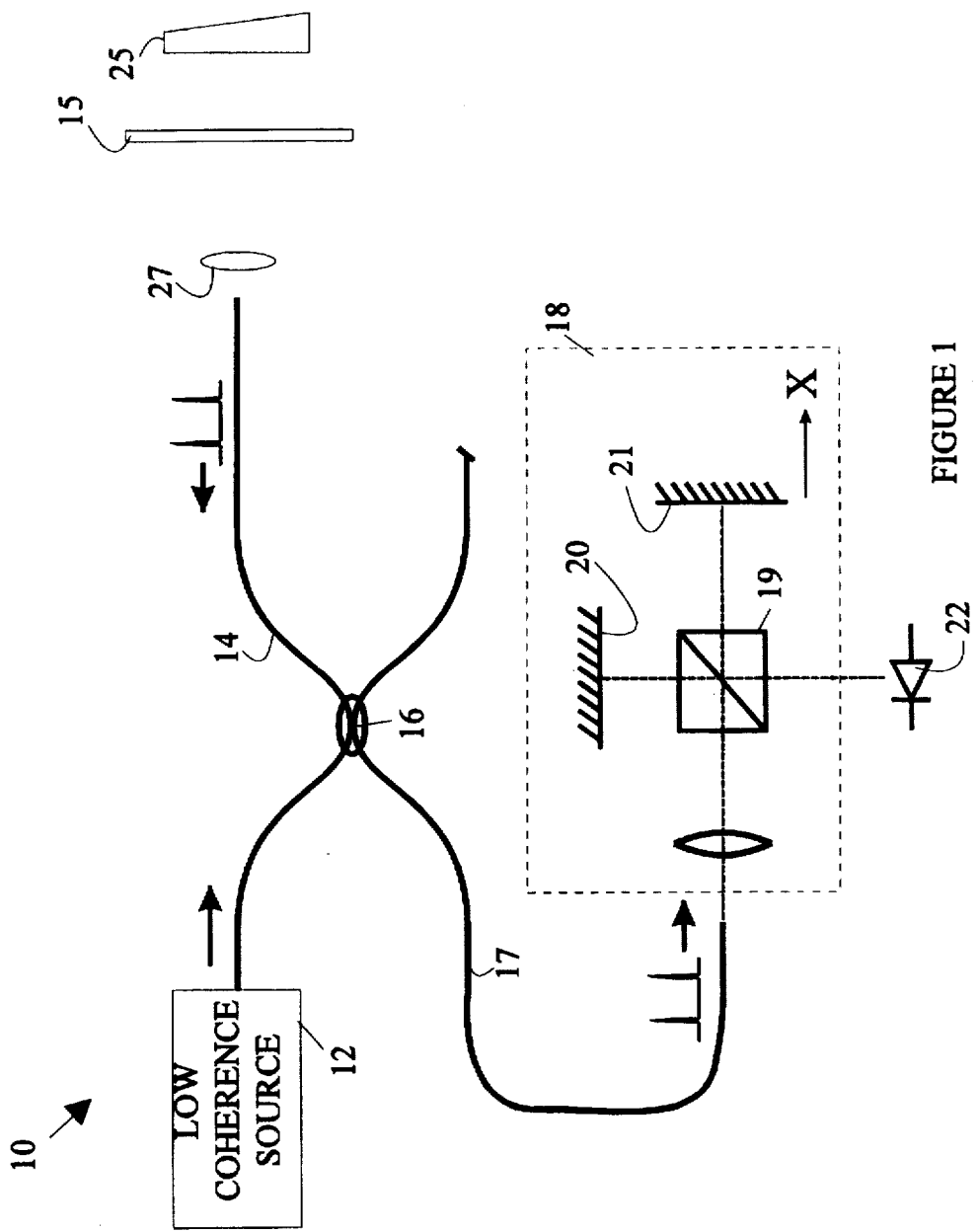
FIG. 1 is a schematic drawing of a thickness monitoring apparatus that utilizes a partially reflecting reference reflector.

The method by which the present invention attains its advantages over the prior art may be more easily understood with reference to FIG. 1 which is a schematic drawing of a thickness monitoring apparatus that utilizes a partially reflecting reference reflector 25. Apparatus 10 utilizes a low coherence light source 12 to generate a light signal that is applied to the film 15 to be measured. A reference reflector 25 is located behind film 15. As will be explained in more detail below, reference reflector 25 is a partially reflecting surface. Light reflected back into fiber 14 that passes through film 15 is collected by lens 27 and routed to a receiver 18 with the aid of a coupler 16 and fiber 17. Receiver 18 is preferably an autocorrelator; however, other forms of receivers may be utilized.

The coherence length of light source 12 must be small compared to the thickness of the film being measured. Such light sources are common in the optical reflectometry arts, and hence, will not be discussed in detail here. For the purposes of the present discussion, it is sufficient to note that an edge emitting light emitting diode may be utilized for light source 12.

An exemplary autocorrelator 18 constructed from a Michelson interferometer is shown at 18. The light incident on Michelson interferometer is split into two beams that traverse different paths by beam splitter 19. The first path is determined by the position of fixed mirror 20 and the second by moveable mirror 21. After traversing the different paths, the light is recombined by splitter 19 and directed to a photodiode 22 which measures the intensity of the light which varies with the position of mirror 21 due to the interference of the light.

Whenever the difference in the reference arms of the interferometer is equal to the difference in optical path length between two different surfaces that have reflected the light, a peak in intensity will be generated at photodiode 22. There will always be a large peak at x=0 corresponding to the case in which each reflection overlaps with itself.

Figure 2:
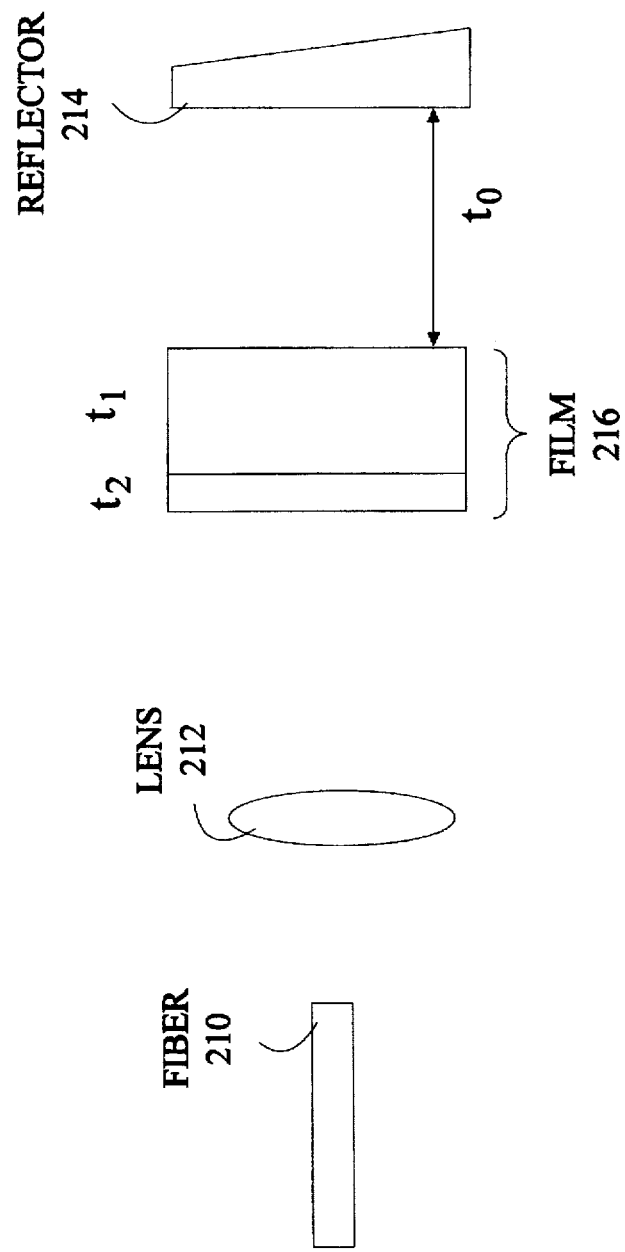
FIG. 2 illustrates an arrangement in which a partially reflecting reflector is used to simplify the interpretation of the output of the autocorrelator when a two layer film is measured.
Figure 3:
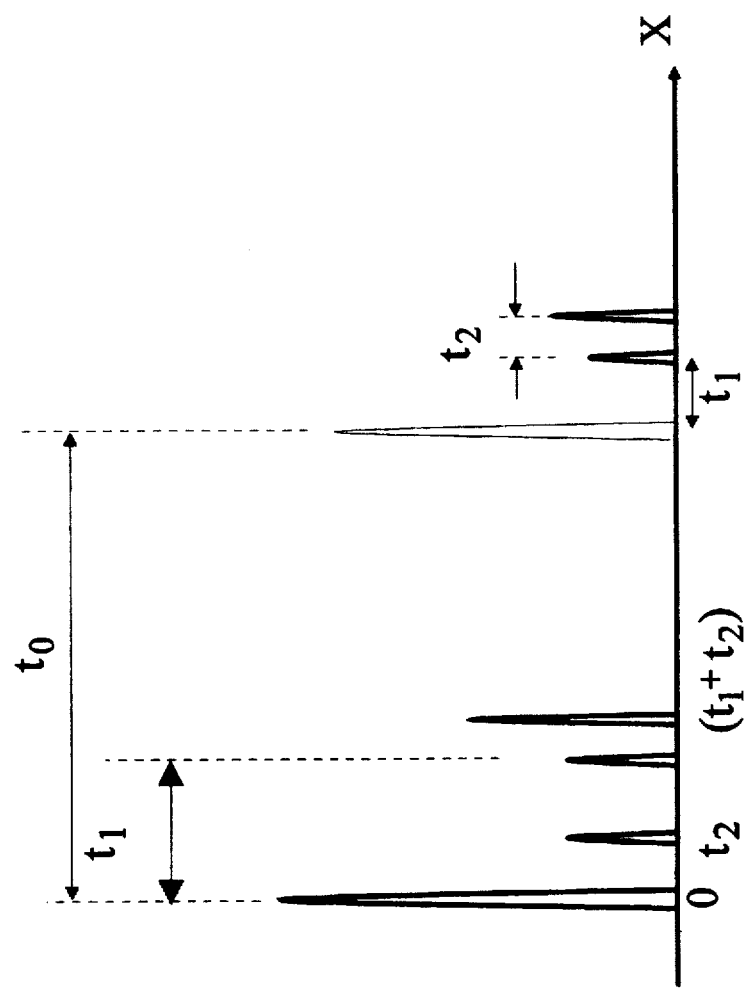
FIG. 3 illustrates the output generated by an autocorrelator receiver when the arrangement shown in FIG. 2 is utilized.

Consider the case in which the film consists of two layers and in which the reference reflector has a reflectivity that is substantially larger than that of the various film boundaries. Such an arrangement is shown in FIG. 2. Light delivered by fiber 210 is collimated by a lens 212 and then passes through a two layer film 216 and is reflected back through film 216 by reflector 214. Denote the distance from the reference reflector to the surface of the first layer by $t_0$. Similarly, denote the thicknesses of the first and second layers by $t_1$ and $t_2$, respectively. There are three possible combinations of reflections between the reference surface and the boundaries of the film. These reflections will correspond to x values of $t_0$, $(t_0+n_1t_1)$, and $(t_0+n_1t_1+n_2t_2)$, where $n_1$ and $n_2$ are the respective indices of refraction of the first and second layers. The peaks corresponding to these reflections are shown in FIG. 3. To simplify the drawing, the group index values have been omitted, i.e., $n_1t_1$ is shown as $t_1$. It should be noted that $t_0$ may be adjusted to provide a spacing for these peaks that is clear of any other peaks in the output of the receiver. It should also be noted that the order of the peaks in the spectrum is the same as the spatial ordering of the layers. Hence, the reference reflector also provides a means for simplifying the interpretation of the output of the receiver.

Figure 4:
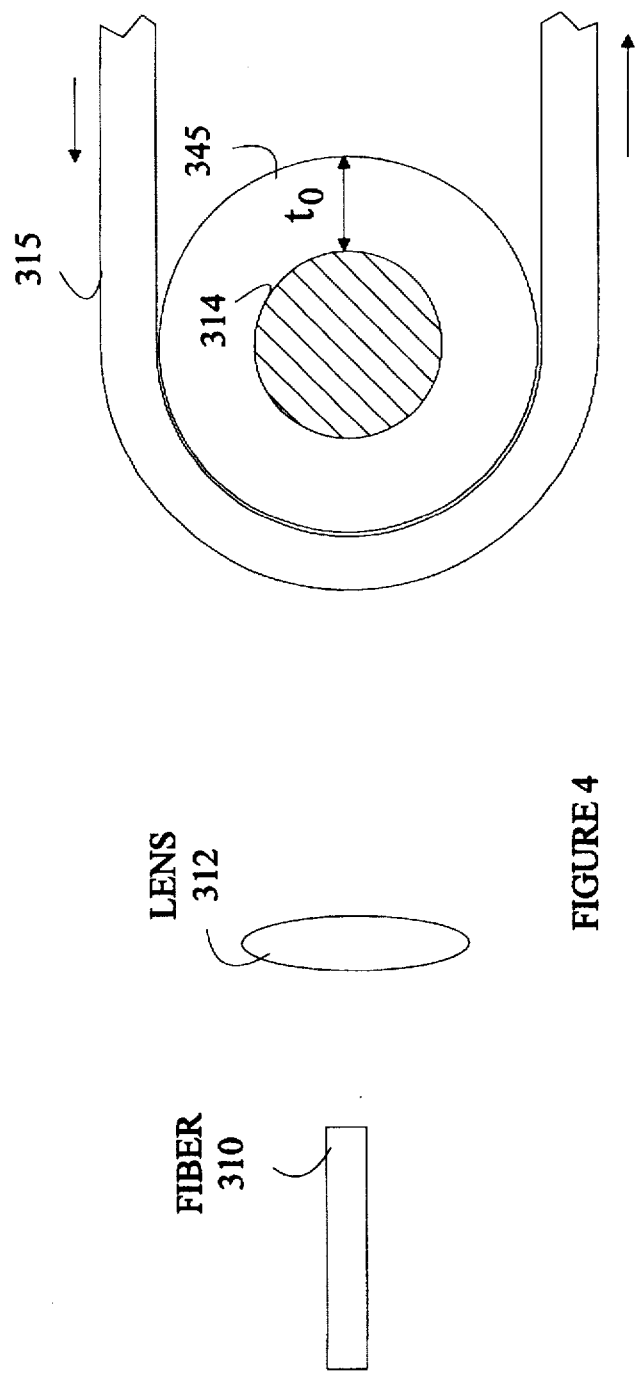
FIG. 4 is a schematic drawing of the preferred embodiment of a reference reflector according to the present invention.

As noted above, the simplification produced by the introduction of the reference reflector requires that the distance $t_0$ remains constant over the period of the measurement. This condition is difficult to meet when film 15 shown in FIG. 1 is moving rapidly on a production line. The present invention overcomes this problem by incorporating the reference reflector into a roller over which the film moves in such a manner that the film is pressed against the roller. Refer now to FIG. 4 which is a schematic drawing of the preferred embodiment of a reference reflector according to the present invention. Light delivered by fiber 310 is collimated by lens 312 before passing through film 315 which moves, or is moved by, a roller 314 having an optically transparent coating 345 thereon. Roller 314 is positioned such that film 315 is held tightly against the coated surface, and hence, ability of film 315 to flutter while being measured is substantially eliminated. The outer surface of roller 314 is a partially reflecting surface, and hence, provides the reference reflections discussed above.

Figure 5:
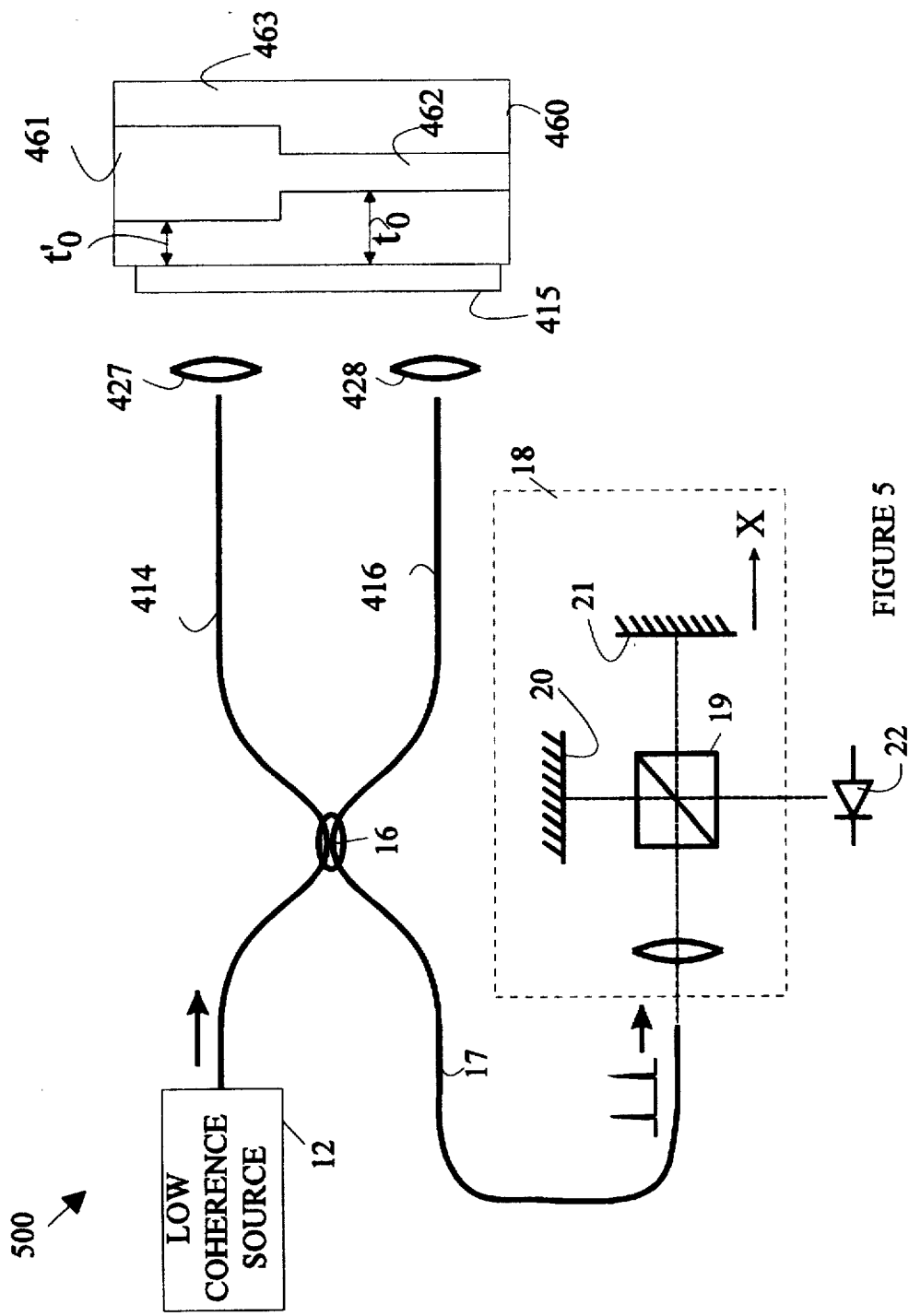
FIG. 5 is a schematic drawing of an embodiment of the present invention that utilizes two probes to provide measurements of the thickness of the film at two different locations utilizing the same receiver.

In some applications, the measurement of the thickness at a number of different locations on the sheet is desired to test for uniformity across the sheet. The present invention can provide such multi-point measurements by splitting the low coherence signal into multiple signals using additional 3 dB couplers or using the additional fiber leaving coupler 16 as shown in FIG. 1 so as to split the signal into additional fibers to be used in constructing additional probes. Such an arrangement is shown in FIG. 5. In this example, the additional fiber from coupler 16 shown in FIG. 1 is used to construct a second probe. If the lengths of fibers 414 and 416 are sufficiently different and the distances from the film to the reference surfaces are likewise chosen to be different, the various probe measurements can be multiplexed onto the same autocorrelator. The additional peaks introduced by the additional probes will be distinct from each other if sufficient differences exist. The second condition is accomplished by using a roller 460 having a partially reflecting core with two different diameters as shown at 462 and 463. The core is coated with an optically transparent coating 463 which supports the film 415 being measured. The probe utilizing fiber 414 and lens 427 has a reference distance of $t'_0$, while the probe constructed from fiber 416 and lens 428 has a reference distance of $t_0$.

As noted above, the reference reflector must be less than perfectly reflecting for the present invention to operate. If the reflectivity of the reference reflector is too great, the signal from the autocorrelator will be reduced leading to unacceptable signal to noise ratios. Similarly, poor signal to noise ratios are obtained if the reflectivity of the reference reflector is too small. The optimum reflectivity, in general, depends on the reflectivity of the layers in the film being measured. For small film reflectivities, the optimal reflectivity can be shown to be between 0.2 and 0.5. In general, satisfactory results may be obtained for reflectivities in the range of 0.04 to 0.9, since the signal to noise ratio is a fairly slowly varying function of the reference reflector reflectance.

Although the above described embodiments of the present invention have utilized a Michelson interferometer as the autocorrelator, other forms of autocorrelator may be utilized. For example, an optical spectrum analyzer which measures the optical power as a function of wavelength or optical frequency can be utilized. The Fourier transform of the frequency domain spectrum provides an output which is identical to that of an autocorrelator.

Figure 6:
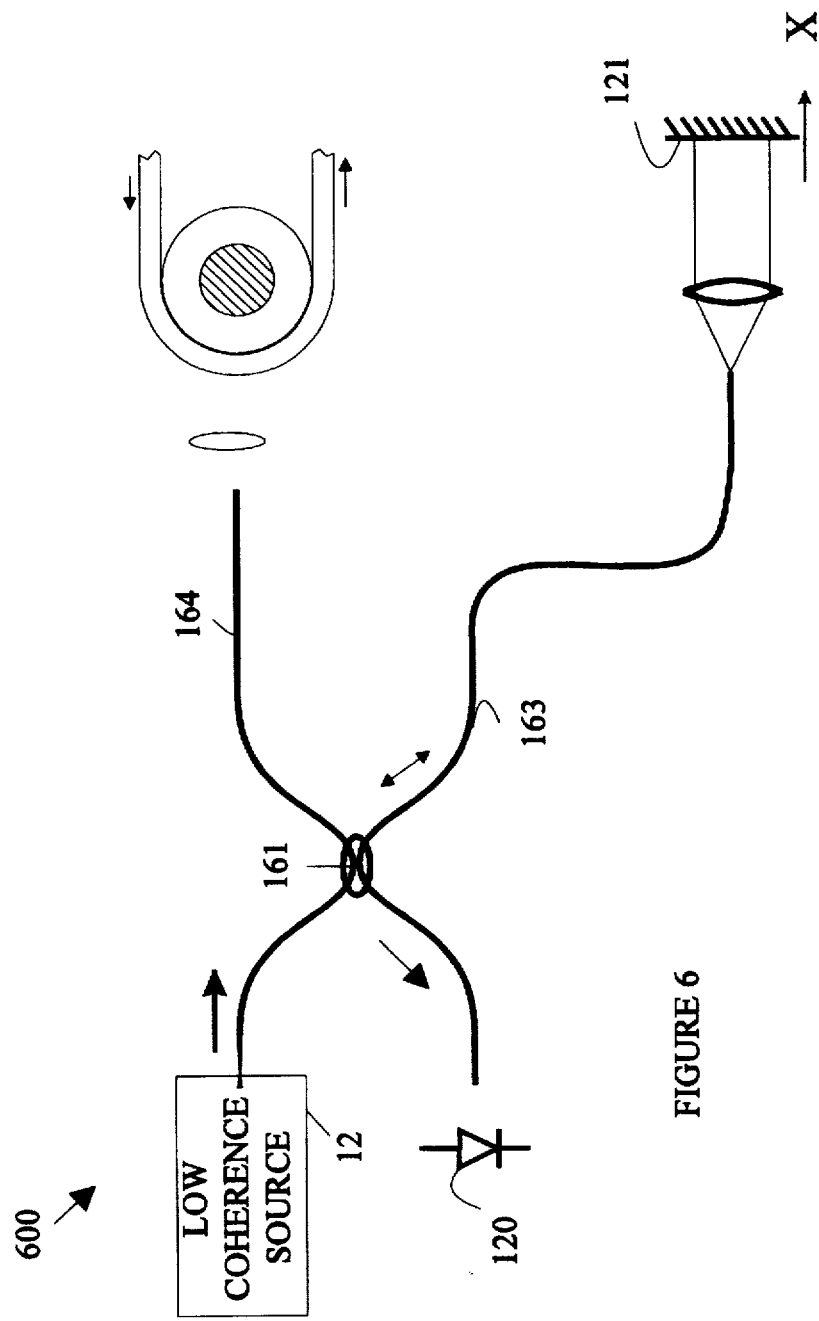
FIG. 6 is a schematic drawing of an embodiment of the present invention that utilizes a reflectrometer for the receiver.

While the above described embodiments of the present invention have utilized an autocorrelator for the receiver, other types of reflectometer receivers may also be utilized. Such an alternative arrangement is shown at 600 in FIG. 6. The light from a low coherence source 12 is split into two signals by a coupler 161. The signal on fiber 164 is applied to the film to be measured as described above. The light reflected back into fiber 164 is combined with the second light signal generated by coupler 161 at coupler 161 after the second light signal has traversed a variable reference path comprising moving mirror 121. The signals combined at coupler 161 will undergo constructive interference when the delay in the reference path matches the transit time for the signals on the probe arm of the reflector. The intensity of the light leaving coupler 161 is measured by a photodetector 121. This type of receiver may be purchased commercially (Hewlett Packard HP8504 Precision Reflectomer). From the output of the photodiode as a function of the mirror position X, the film thickness and group index of refraction may be determined as discussed above.

Any type of reflectometer having sufficient spatial resolution to distinguish the film reflections can be used in this configuration. This configuration, however, is not preferred because the results are sensitive to variations in the lengths of the various fibers. Such variations may occur due to temperature fluctuations or mechanical stress. In contrast, the results obtained with an autocorrelating receiver are independent of such fluctuations.

The above described embodiments of the present invention have utilized a transparent coating to maintain the film at a distance from the reflective surface of the roller. However, it will be apparent to those skilled in the art that the reflective surface can be placed in a recess in the roller. In this case, an air gap separates the film from the reflective surface.

Various modifications to the present invention will become apparent to those skilled in the art from the foregoing description and accompanying drawings. Accordingly, the present invention is to be limited solely by the scope of the following claims.

What is claimed is:

1. An apparatus for measuring the thickness of a transparent film having top and bottom surfaces, said apparatus comprising:

means for generating a probe light signal from a low coherence light source and applying said probe light signal to said film;

a roller having a partially reflecting surface and means for positioning said film at a fixed distance from said reflecting surface;

means for collecting light reflected back from said partially reflecting surface; and a receiver for receiving said collected light and for determining the time delay between light reflected from said top and bottom surfaces of said film from said collected light.

2. The apparatus of claim 1 wherein said receiver comprises an optical autocorrelator.

3. The apparatus of claim 1 wherein said receiver comprises an optical reflectometer.

4. The apparatus of claim 1 wherein said receiver comprises an optical spectrum analyzer.

5. The apparatus of claim 1 wherein means for positioning said film comprises an optically transparent coating on said roller.

6. The apparatus of claim 5 wherein said roller comprises first and second regions and wherein said optically transparent coating has different thicknesses in said first and second regions.

7. The apparatus of claim 1 wherein said film comprises a plurality of layers and wherein said receiver determines the time delay between light reflected from said partially reflecting surface and at least one boundary between two of said layers.

8. A method for measuring the thickness of a transparent film having top and bottom surfaces, said method comprising the steps of:

generating a probe light signal from a low coherence light source and applying said probe light signal to said film;

providing a roller having a partially reflecting surface and means for positioning said film at a fixed distance from said partially reflecting surface;

collecting light reflected by said film and said partially reflecting surface; and determining the time delay between light reflected from said top and bottom surfaces of said film from said collected light in a receiver.

9. The method of claim 8 wherein said receiver comprises an optical autocorrelator.

10. The method of claim 8 wherein said receiver comprises an optical reflectometer.

11. The method of claim 8 wherein said receiver comprises an optical spectrum analyzer.

12. The method of claim 8 wherein means for positioning said film comprises an optically transparent coating on said roller.

13. The method of claim 12 wherein said roller comprises first and second regions and wherein said optically transparent coating has different thicknesses in said first and second regions.

14. The method of claim 1 wherein said film comprises a plurality of layers and wherein said method further comprises the step of determining the time delay between light reflected from said partially reflecting surface and at least one boundary between two of said layers.

* * * * *